Figure 1:
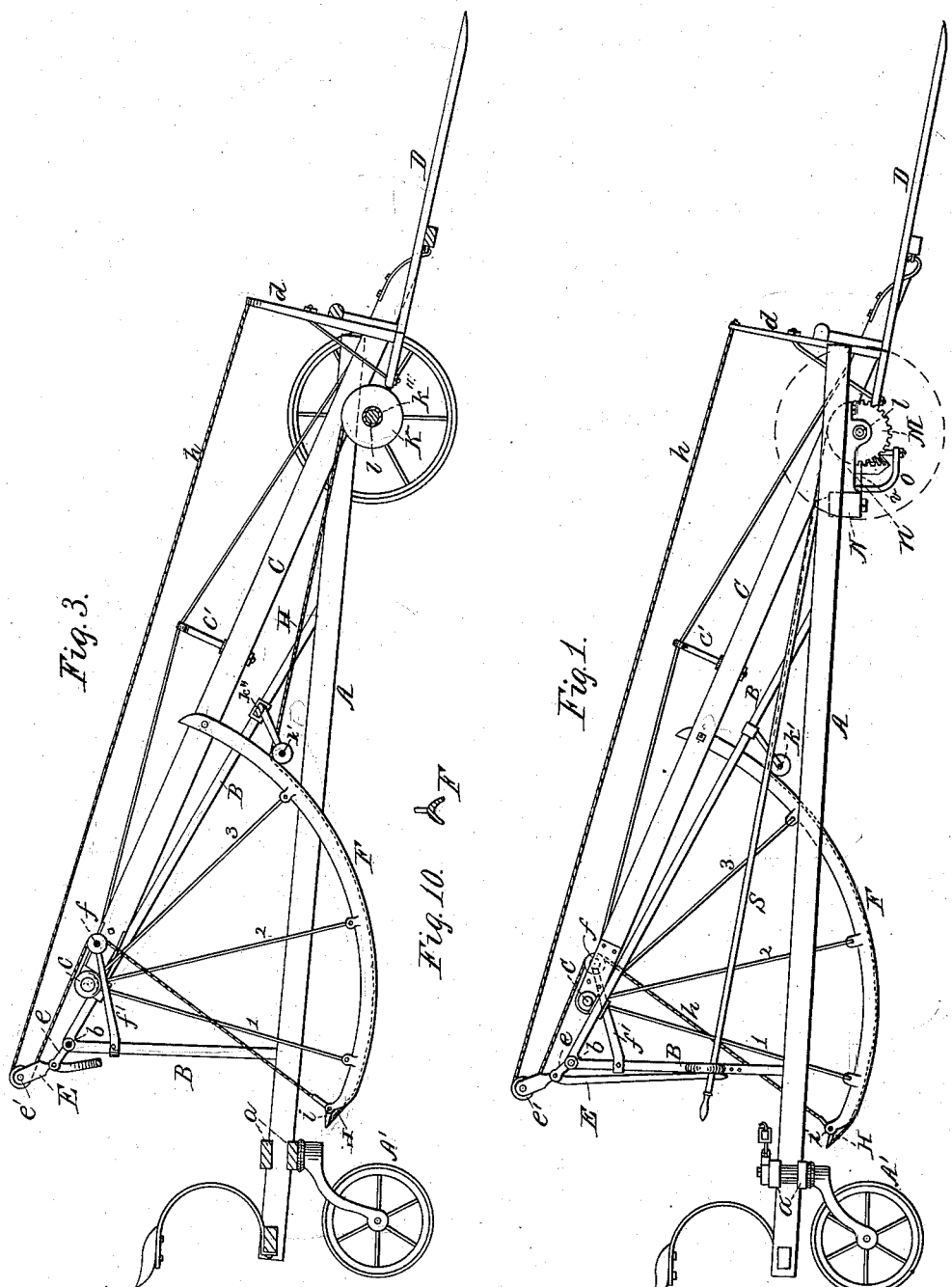

(No Model.) 5 Sheets—Sheet 1.

R. O. DAVIS.
COMBINED HAY RAKE AND RICKER.

No. 385,252. Patented June 26, 1888.

Witnesses:
W. C. Jirdinston.
Charles Billow,

Inventor,
Rees O. Davis,
by Peck & Rector,
his Attorneys.

(No Model.) 5 Sheets—Sheet 2.

R. O. DAVIS.
COMBINED HAY RAKE AND RICKER.

No. 385,252. Patented June 26, 1888.

Witnesses:
W. C. Jirdinston.
Charles Billow.

Inventor:
Rees O. Davis
by Peck & Rector,
his Attorneys.

(No Model.)

R. O. DAVIS.

COMBINED HAY RAKE AND RICKER.

No. 385,252. Patented June 26, 1888.

Witnesses:
W. C. Jirdinston.
Charles Billon.

Inventor:
Rees O. Davis,
by Peck & Rector,
his Attorneys.

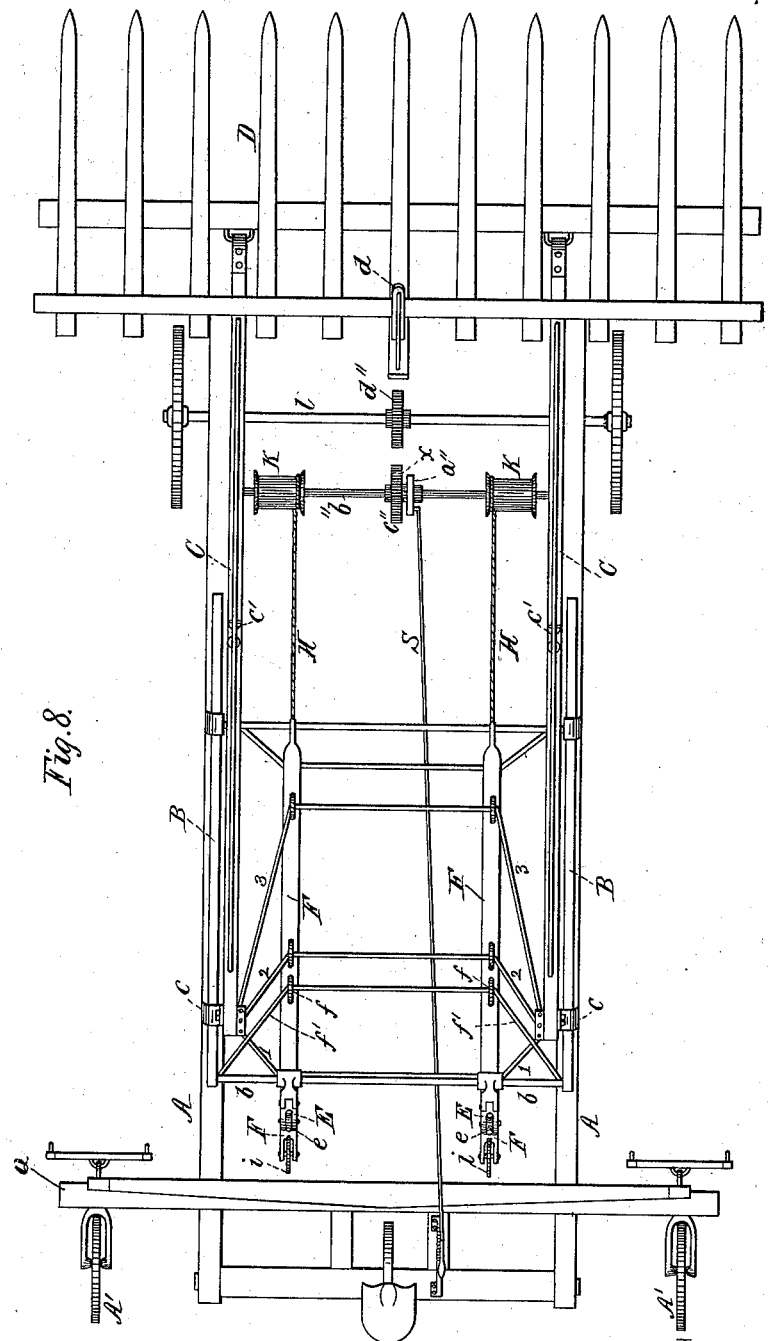

(No Model.)  5 Sheets—Sheet 5.
R. O. DAVIS.
COMBINED HAY RAKE AND RICKER.
No. 385,252.  Patented June 26, 1888.
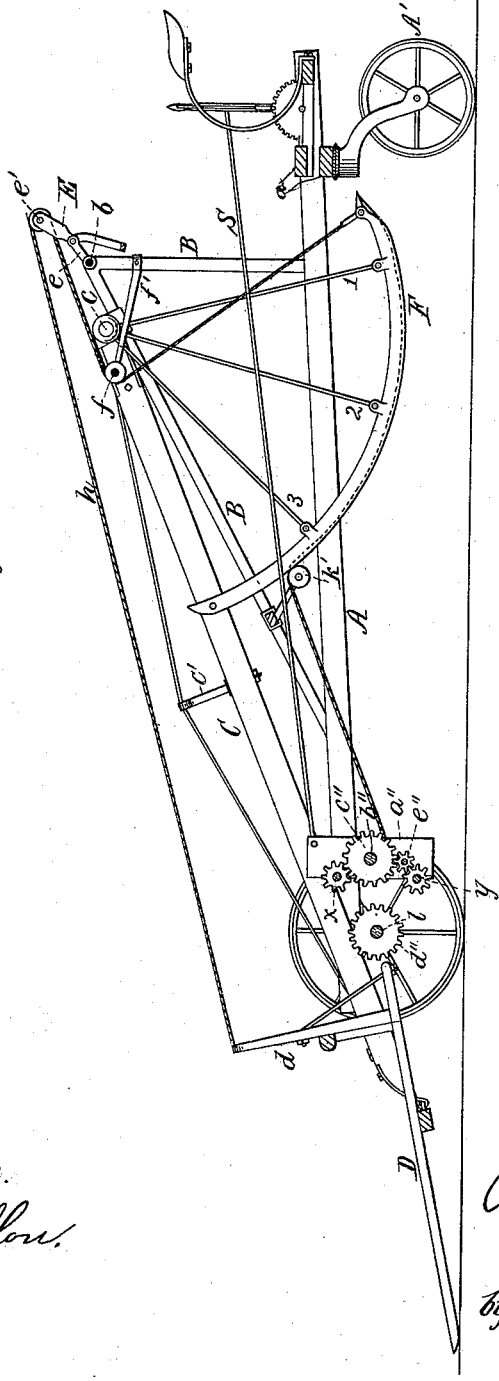
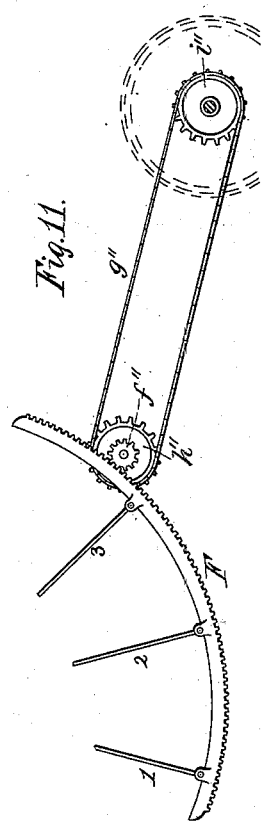
Witnesses:
W. C. Firdinston.
Charles Billou.
Inventor:
Rees O. Davis,
by Peck & Rector,
his Attorneys

UNITED STATES PATENT OFFICE.

REES O. DAVIS, OF MILAN, MISSOURI, ASSIGNOR TO THE STODDARD MANUFACTURING COMPANY, OF DAYTON, OHIO.

COMBINED HAY RAKE AND RICKER.

SPECIFICATION forming part of Letters Patent No. 385,252, dated June 26, 1888.

Application filed June 15, 1885. Serial No. 168,814. (No model.)

*To all whom it may concern:*

Be it known that I, REES O. DAVIS, of Milan, in the county of Sullivan and State of Missouri, have invented certain new and useful Improvements in Combined Hay Rakes and Rickers; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

When gathering large fields of hay, it has of late years been customary to use large rakes which travel in advance or on the same line with the horses. These rakes, when they have gathered a sufficient load, are driven to what is called a "stacker" or "ricker," which receives the hay from the rake onto a large fork and elevates it to and deposits it upon the hay-stack. This method of gathering hay, while superior in many respects to the older and well-known way of raking the hay into windrows and then loading it on wagons, is objectionable in form, for when the rake advances to place the load on the stacker the teeth of the rake often strike against and break the teeth of the fork, or vice versa. Again, the use of the rake and stacker necessitates the employment of two or three men—one to attend the rake, one to attend the ricker or stacker, and another to distribute the hay on the stack.

My invention avoids the above and many other objections not mentioned by combining the rake and stacker—that is, by mounting on the rake-carriage elevating devices which are actuated at the will of the driver by the motion of the wheels, and which elevate the load and deposit it where desired on the hay-rick, substantially as hereinafter described, and as illustrated in the drawings, in which—

Figure 2:
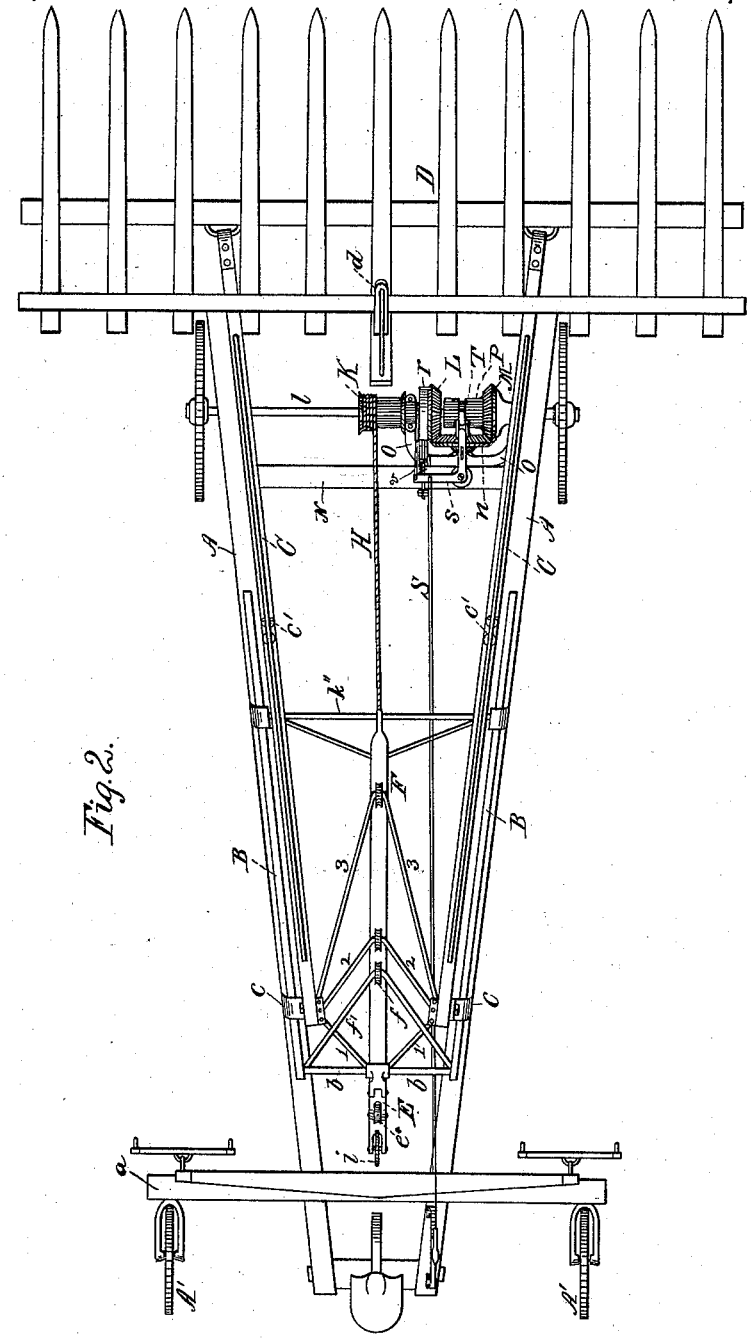
Figure 4:
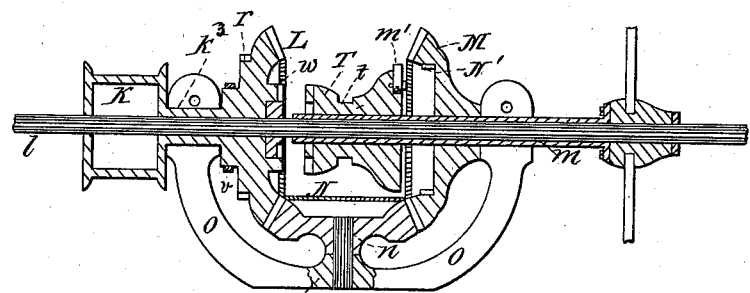
Figure 5:
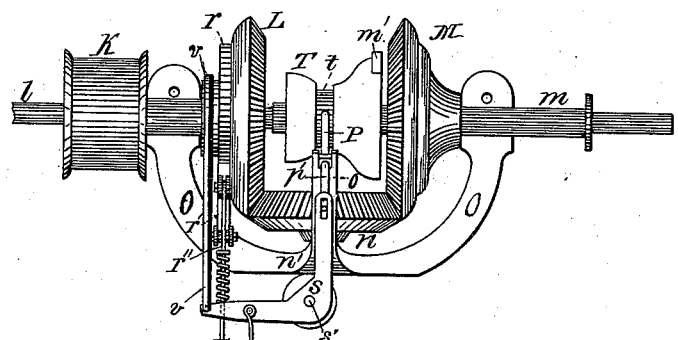
Figure 6:
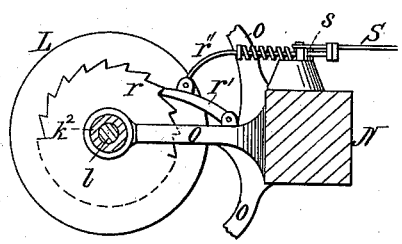
Figure 7:
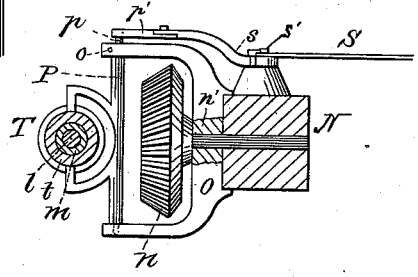

Figure 1 is a side elevation of a machine embodying my invention. Fig. 2 is a plan view thereof. Fig. 3 is a longitudinal vertical section; and Figs. 4, 5, 6, and 7 are detail views of the devices for imparting the motion of the forward wheels to the hoisting devices; and Figs. 8, 9, 10, and 11 are detail views showing modifications of various parts of the machine.

The same letters are used to indicate identical parts in all the figures.

In the drawings, A A represent the sill-timbers of the carriage, which are closer together at their rear ends than at their forward ends, as shown in Fig. 2. At or near their rear ends they are connected by a suitable cross-tie, and a short distance in front of this tie are the cross-beams $a$ $a$, one connected to the under surface and the other to the top surface of the sill-timbers, immediately over the under one. The ends of these cross-beams extend out a short distance beyond the side timbers and have in them bearings for the caster-wheels A' A'. I do not, however, consider it a departure from my invention if only one caster-wheel is used and that placed in suitable bearings secured to said cross-beams between said sill-beams A. Resting on and pivoted in beams $a$ in a transverse position to the sill-timbers is a doubletree or equalizer. The timbers A are provided near their forward ends with bearings for the axle of the front wheels, concerning which more will be hereinafter said.

Secured to and projecting from the sill-timber A in front of the doubletree are the channel-iron frames B, which extend upward three or four feet and then pursue an obliquely-downward course toward the forward ends of the said timbers. These frames are connected at their bend or apex by a suitable cross-bar, $b$, and are also provided on their longitudinally-inclined portions, a short distance in front of said bends, with suitable bearings, $c$ $c$, for the arms C C of the rake D. These arms C are strengthened considerably by the trusses $c'$ $c'$, though other methods of strengthening said arms C may, however, be resorted to without departing from my invention. The forward ends of the arms C extend a short distance in front of the forward ends of the sill-timbers, and are suitably hinged to the cross-frame of rake D. The central tooth of the rake extends to the rear of the rake-head, and its vertical portion connecting it to the head extends a short distance above said head to form an arm, $d$, and is strengthened by a brace, the base of which rests on the horizontal extension of said central tooth.

Pivoted in the end of a short arm, e, fast to and extending from the cross-bar b, is a lever, E, the upper arm of which is shorter than the lower arm, and has journaled in its extremity a sheave, $e'$. The lower arm of this lever E pursues an oblique downward and sidewise course, so as to be convenient to the hand of the operator.

The journals of the arms C are provided with iron plates, in which the ends of the links 1 2 3, which support the segmental guide F between said arms C, are fastened. The periphery of this guide is concave, as seen by the detail cross section, Fig. 10, and its forward end passes upward midway between arms C C to or slightly above the horizontal plane of the same, where it is secured by a cross-bar or other suitable means.

In the rear lower end of guide F is journaled a bell-crank, i, which is connected to the vertical arm of the central tooth of the rake by a rope, h. This rope h is secured near the extremity to the said vertical arm and pursues a longitudinal course to the sheave $e'$ in the end of the upper arm of lever E, around which it makes a return-coil, and then pursues an obliquely-downward course toward the front of the machine to a concave sheave, f, which is journaled between the connected ends of an angle-frame, $f'$, extending horizontally from the vertical parts of the channel-iron frame toward the front of the machine, and from this sheave to the end of the bell-crank i.

To the other arm of the bell-crank is attached a hoisting-rope, H, which runs in the concave periphery thereof over or between the friction or guide pulley $k'$, which is journaled in suitable bearings secured to a cross-bar, $k''$, connecting the forward portions of the frames B just in rear of where they are connected to or are secured in the sill-frames. The rope H then pursues a horizontal and longitudinal course to the drum K, around which it is wound. This drum K is secured to the inner end of a sleeve, $k^3$, loose on axle l of the front wheels, and which drum has made integral therewith or permanently secured to its outer end the beveled pinion L. This pinion L imparts or receives motion from the pinion M, loose on sleeve m, (which is made fast to the right-hand wheel,) through the medium of the idle-pinion n, journaled on a stud or bolt, which latter passes transversely through the cross-beam N, connecting the sill-frames at a point just to the rear of the axle to which it runs parallel.

O is a semicircular frame, which is secured to the sill-frame at one end and to the beam N at about its center of length, where it is provided with a boss, $n'$, through which the bolt on which pinion n is journaled passes, and is provided at its inner end with bearings for the sleeve $k^3$.

Radiating at angles to the arms of frame O, in which sleeves $k^3$ and m are journaled, are the angle-arms o o, the lower one of which is provided with bearings for the adjacent pivotal stud of the semicircular shifter P. Aligned with and projecting in an opposite direction from the aforesaid pivotal stud of shifter P is a corresponding pivotal stud, p, which is journaled in the bearings made between the bifurcated end of the upper arm, o, where it is secured by a bolt passing laterally through said bifurcated ends. On the end of the pivotal stud p is an arm, $p'$, which extends to the rear a short distance and has its end pivoted in the end of the contiguous arm of the bell-crank s.

Bell-crank s is fulcrumed on the end of a bolt, $s'$, which passes vertically through beam N, and its other arm is pivotally connected to the contiguous end of the operating-rod S. The rivet uniting the end of the arm $p'$ and the arm of the bell-crank passes through a suitable slot in one or both of said arms, and thus permits of a certain limited oscillation of the arm $p'$ and the semicircular shifter P. The ends of the semicircular shifter P turn in toward and enter diametrically opposite each other the circumferential groove t of the head T. This head T has a longitudinal reciprocal motion on the end of the sleeve m (which extends between pinions L and M) by means of a feather projecting from said sleeve into a longitudinal groove in the bore of said head; but it revolves with said sleeve and has no independent revolution of its own.

On the end of the head T, facing pinion M, is a pawl, $m'$, so placed that its engaging-point projects beyond the periphery of said head. In the face of pinion M, contiguous to head T, is a circular depression concentric to the center of said pinion, the side walls of which are serrated to form a ratchet, $N'$. This ratchet, when the head T is moved toward it, is engaged by the pawl $m'$.

Between head T and pinion L is a collar, w, fast to the shaft, having in its face contiguous to the head T alternately depressed and raised surfaces, which are engaged by alternately raised and depressed surfaces in the contiguous end of head T. In the face of pinion L beyond the circumference of the collar w, and in the adjacent end of head T, encircling the circumference of the alternately raised and depressed surfaces, is a circular series of raised and depressed surfaces, which engage each other, and the depth of the depressions and the extent of the projections of the raised surfaces are greater than those of the inner clutch.

It will be observed from the drawings that when the drum acquires the same motion of the forward wheels, when the machine is advancing, it winds the rope H around it and elevates the rake. To give the drum this motion the operator pushes forward the rod S away from him, thus oscillating the bell-crank s in such manner that the semicircular shifter P will push the head T into engagement with pinion L, thus imparting the motion of the right-hand wheel to the drum, which is permanently fixed to the same sleeve as said pinion L. It will be observed that the left-hand wheel is permanently fixed to the axle $l$, and that if there were no means to impart the motion of the axle to the drum the right-hand wheel would furnish the only power to hoist the rake. It is for this purpose that the collar $w$ is made fast to the axle and is engaged by the head T. At the same time said head engages the clutch in pinion L, thus giving the drum the benefit of the power furnished by both the forward wheels. In order now to prevent any backward movement of the drum K, the pinion L is provided on the back or side thereof facing the drum with a ratchet, $r$, which is engaged by a pawl, $r'$. This pawl is pivoted to a lug projecting vertically from the inner arm of the semicircular frame O, and it has a projecting lug on its back, by means of which the connecting-rod $r^2$ is pivoted thereto. The other end of this connecting-rod $r^2$ passes through an opening in the same arm of the bell-crank $s$ that the rod S is pivoted to, and is provided with an enlargement on its rear end. When the rod S is pushed forward to throw the head T into engagement with pinion L, the pawl $r'$ is thereby put in engagement with ratchet $r$ through the medium of the spring surrounding the rod $r^2$, and, on the contrary, when the rod S is pulled back the pawl is taken out of engagement with the ratchet $r$ by the action of the bell-crank S upon the rod $r^2$. The same motion of the rods which withdraws the pawl $r'$ from engagement with ratchet $r$ disengages the head T from pinion L and collar $w$, and at the same time throws it into engagement with the pinion M through the medium of the pawl $m'$, secured to the contiguous side of head T and ratchet N' in pinion M. When a forward motion is acquired by pinion M, the motion of pinion L is reversed through the medium of the idle-gear $n$, thus unwinding the hoisting-rope H from the drum and lowering the rake.

When it is desired to disconnect the drum from the influence of the power-imparting devices just described, the rod S is manipulated so as to place head T in such position between pinions L and M that it engages neither of them.

There may be various modifications of the parts of my machine which would perform identically the same functions of the devices for which they are substituted, and in most cases would, it is apprehended, answer just as well. For instance, in Fig. 8 is shown a plan view of a machine in which the sill-frames are about as far apart at their rear ends as at their forward ends, and in which there are two segmental guides—one adjacent to each arm supporting the rake—and two drums—one for each side. In the above modification is shown a modification of the devices for imparting the motion of the forward wheels to the hoisting apparatus. This modification, Figs. 8 and 9, consists of a head, $a''$, loose on a drum-shaft, $b''$, parallel with the axle. On this drum-shaft next the head is a pinion, $c''$, and in transverse alignment on the axle is a similar pinion, $d''$. Journaled on a stud projecting laterally from said head is a small pinion, $x$, which meshes with the pinion on the drum-shaft, and journaled in a position below pinion $x$, on a suitable stud, is a pinion, $y$, which, through the medium of an idle-pinion, $e''$, is connected to the pinion on the drum-shaft. This head can be oscillated so as to bring pinion $x$ in engagement with the pinion $d''$ on the axle, thus turning the drum shaft in one direction; or the head may be oscillated so as to bring the pinion $y$ into engagement with the pinion on the axle, thus turning the drum shaft in the opposite direction.

There are several modifications of the segmental guide which can be used, all of which I claim as coming within the spirit of my invention—e. g., a segmental gear, as in Fig. 11, could be substituted for the concave periphery thereof and engaged by a pinion, $f''$, actuated through the medium of an endless chain, $g''$, which would travel around a sprocket-wheel, $h''$, and another sprocket-wheel, $i''$, which could be substituted for the drum; or, instead of this segmental guide having a concave periphery, the arms 1, 2, and 3 could have their ends bifurcated, so that the rope H would travel or come between them.

It is possible that when the rake is being lowered its weight may cause it to make the right-hand forward wheel slip, thus bringing said rake down suddenly, possibly injuring it and the machine. To avoid this, contiguous to the ratchet $r$, integral with pinion L, is a shoulder, around which a flat band, $v$, passes, one end of which is fastened to beam N and the other to the arm of the bell-crank $s$, to which the rod S is secured. Thus, whenever the rod is pulled by the operator, the band will tighten around the shoulder and operate as a brake on the drum.

Besides the modifications above described, there are other changes in the construction of the frame-work which may be made without departing from the spirit of my invention.

The operation of the machine after a load has been gathered may be described as follows: The operator, by means of the lever S, throws the drum into operation, whereupon the first action of the rope H is to pull the bell-crank $i$ around, and through the medium of the rope $h$ and arm $d$ lift the points of the rake up to a horizontal position, thus raising the points of its teeth clear from the ground and holding the load level. If the machine is a great distance from the stack, he may then disengage the drum and proceed with the rake in the position just described toward the stack. At the proper distance from the stack he again throws the drum into action, whereupon the arms C are lifted by the winding up of the rope H and the load is elevated. As it rises, the operator, by disengaging the lever E, which has been heretofore held by any suitable latch or fastening, and drawing it toward him, throws forward the sheave $e'$ gradually and sufficiently to keep the rake level, until, having got the load over the stack, he draws back the lever E sufficiently to dump the rake and discharge its load upon the stack. He then backs or turns from the stack and resets the rake for the gathering of another load. By means of the segment F, concentric with the axes of the arms C, a powerful leverage is obtained, and the use of a cumbersome overhanging frame from which the rake has been heretofore lifted in machines of this class is obviated.

Having thus fully described my invention, I claim—

1. In a combined rake and stacker, the combination of the following elements: a carriage-frame having supporting wheels and axles, hoisting-arms pivoted to said frame, a rake hinged to the front of said hoisting-arms, a drum with mechanism for locking it to the axle of the carrying-frame and for holding it locked independently of said axle, a hoisting-segment secured to the hoisting-arms and arranged concentric with the pivots thereof, a hoisting-rope connecting the segment and the drum, a tilting and dumping rope secured to the rake-head, and a lever operating on said rope to tilt or dump the rake, substantially as and for the purpose specified.

2. In a combined rake and stacker, the combination of the following elements: a carrying-frame, hoisting-arms pivoted to said frame, a rake hinged to the front of said hoisting-arms, a drum with mechanism for locking it to the axle of the carrying-frame and for holding it locked independently of said axle, a hoisting-segment secured to the hoisting-arms and arranged concentric with the pivots thereof, a hoisting-rope secured at one end to one arm of a bell-crank pivoted at the rear of the segment and at the other end to the drum, and a tilting and dumping rope secured at its forward end to the rake and at its rear end to the other arm of said bell-crank, substantially as and for the purpose specified.

3. The combination, with the arms C, journaled in suitable frames, B B, rake D, hinged to the free ends of said arms, of the rope $h$, lever E, having a sheave journaled in its upper end, segmental guide-rope H, co-operating therewith, drum K, axle $z$, and means for operating said drum.

4. In a combined hay rake and stacker, the combination, with the frame having the supporting-wheels, rotating axle, and pivoted hoisting-arms moved by the axle, of reversing-gearing for changing the direction of movement of said arms at will during the continuous forward rotation of the axle, substantially as described.

5. In a combined hay rake and stacker, the combination, with axle $z$, drum K, hoisting-rope, and rake hinged to the free ends of suitable pivoted arms, of the bevel-pinion L, having a clutch in its face and fast to the sleeve to which said drum is secured, beveled idle-gear $n$, beveled pinion M, loose on sleeve, reciprocating head T, having counterpart clutch in its end contiguous to pinion L, and having a pawl pivoted to its opposite end, designed to engage a ratchet made in the inner circumference of a circular depression in the contiguous face of pinion M, sleeve $m$, on which said head T reciprocates, secured at its outer end to the contiguous carriage-wheels, axle I, and means for reciprocating said head.

6. The combination, with rake D, arms C, segmental guide F, and hoisting-rope H, of the axle $z$, drum K, pinions L and M, idle-gear $n$, reciprocating head T, collar $w$, fast to axle, sleeve $m$, on which said head reciprocates, axle $l$, and carriage-wheel made fast, the shifter P, bell-crank $s$, and rod S.

7. The combination, with rake D, arms C, segmental guide F, and hoisting-rope H, of the axle $z$, drum K, pinions L and M, idle-gear $n$, reciprocating head T, sleeve $m$, on which said head reciprocates, axle $l$, and carriage-wheel made fast to the end thereof, shifter P, bell-crank $s$, and rod S.

8. The combination, with rake D, arms C, segmental guide F, and hoisting-rope H, of the axle $z$, drum K, pinions L and M, idle-gear $n$, reciprocating head T, sleeve $m$, shifter P, bell-crank $s$, and rod S, the ratchet $r$, made integral with pinion L, pawl $r'$, and rod $r^2$.

In testimony that I claim the foregoing as my own I hereunto affix my signature in presence of witnesses.

REES O. DAVIS.

Witnesses:
JAMES H. COYNE,
FRANK D. THOMASON,
H. T. KNIGHT,
W. H. BONER.